(12) United States Patent
Vijaykumar et al.

(10) Patent No.: US 9,588,864 B2
(45) Date of Patent: Mar. 7, 2017

(54) METHODS FOR ASSESSING DATA CENTER EFFICIENCY AND DEVICES THEREOF

(75) Inventors: Nagarajan Vijaykumar, Bangalore (IN); Vishwanath K. Narayan, Bangalore (IN)

(73) Assignee: Infosys Ltd., Bangalore (IN)

( * ) Notice: Subject to any disclaimer, the term of this patent is extended or adjusted under 35 U.S.C. 154(b) by 1321 days.

(21) Appl. No.: 13/453,306

(22) Filed: Apr. 23, 2012

(65) Prior Publication Data

US 2013/0166250 A1 Jun. 27, 2013

(30) Foreign Application Priority Data

Dec. 27, 2011 (IN) .......................... 4602/CHE/2011

(51) Int. Cl.
*G06F 19/00* (2011.01)
*G06F 11/30* (2006.01)
*G06F 11/34* (2006.01)

(52) U.S. Cl.
CPC ...... *G06F 11/3062* (2013.01); *G06F 11/3409* (2013.01); *Y02B 60/165* (2013.01)

(58) Field of Classification Search
CPC .................................................. G01R 21/006
USPC ................................................ 702/182–185
See application file for complete search history.

(56) References Cited

U.S. PATENT DOCUMENTS

| 7,653,499 | B2 | 1/2010 | Corrado et al. |
| 7,721,125 | B2 | 5/2010 | Fung |
| 7,822,967 | B2 | 10/2010 | Fung |
| 7,827,421 | B2 | 11/2010 | Brewer et al. |
| 7,856,549 | B2 | 12/2010 | Wheeler |
| 2008/0269932 | A1* | 10/2008 | Chardon ............... G06T 11/206 700/98 |
| 2010/0010688 | A1* | 1/2010 | Hunter .................... G06F 1/206 700/300 |

OTHER PUBLICATIONS

Accenture, "Accenture IT Green Maturity Assessment," retrieved from http://itmanagersinbox.com/320/accenture-it-green-maturity-assessment/, last accessed Dec. 16, 2011.
Bianchini et al., "Power and Energy Management for Server Systems," IEEE Xplore Digital Library, Computer 37(11):68-76 (2004).
Landman et al., "Activity-Sensitive Architectural Power Analysis," IEEE Xplore Digital Library, Computer-Aided Design of Integrated Circuits and Systems 15(6):571-587 (1996).
(Continued)

*Primary Examiner* — Edward Raymond
(74) *Attorney, Agent, or Firm* — LeClairRyan, a Professional Corporation (57) ABSTRACT

A method, non-transitory computer readable medium, and apparatus for assessing efficiency of a data center includes querying, based on a system management protocol, each of a plurality of information technology (IT) devices to obtain utilization information. A power rating value is obtained for each of the plurality of IT devices. An IT power consumption value for the plurality of IT devices is generated based on the utilization information for the plurality of IT devices and the power rating values. A value for at least one efficiency metric is generated and output based on the IT power consumption value.

18 Claims, 4 Drawing Sheets

(56) References Cited

OTHER PUBLICATIONS

Accenture, "Accenture Green Maturity Model," retrieved from http://www.accenture.com/Global/Technology/Technology_Consulting/GreenMaturityModel.htm, last accessed Feb. 28, 2012.
Francis et al., "Green Maturity Model for Virtualization," retrieved from http://msdn.microsoft.com/en-us/library/dd393310.aspx, last accessed Dec. 16, 2011.

* cited by examiner

METHODS FOR ASSESSING DATA CENTER EFFICIENCY AND DEVICES THEREOF

This application claims the benefit of Indian Patent Application Filing No. 4602/CHE/2011, filed Dec. 27, 2011, which is hereby incorporated by reference in its entirety.

FIELD

This technology generally relates to methods and devices for assessing the efficiency of a data center and, more particularly, for determining information technology device and infrastructure utilization information, including power utilization, in order to generate a value for at least one efficiency metric for the data center.

BACKGROUND

As data centers become larger and more numerous, efficient operation is desirable, particularly to reduce energy utilization and associated cost, which is a substantial portion of the operational cost of a data center. In order to assess and quantify energy utilization, a power usage effectiveness (PUE) index, and its inverse, the data center infrastructure efficiency (DCIE), are two standard efficiency metrics used by data center administrators which consider the power utilization of the information technology (IT) infrastructure as compared to the total power utilization of the data center.

In order to determine the power utilization of the IT infrastructure, including servers, switches, and storage devices, hardware devices, such as power meters, can be disposed proximate each server device, each server rack, or between the incoming power supply and the IT infrastructure, for example. However, monitoring using a plurality of meters requires additional cost to obtain, install, and maintain the meters, additional space, which is often at a premium, in the data center to locate the meters, and an additional mechanism for aggregating, displaying, and/or analyzing the output of the meters, such as in the event calculation of an efficiency metric value is desired. In an implementation in which a location exists allowing one meter, or relatively few meters, to isolate the power utilization of the IT infrastructure, or portions thereof, the resulting data will lack the granularity required to effectively analyze the IT devices and make decisions to improve the efficiency of the data center.

Software monitoring applications running in the background on each of a plurality of IT devices have also been developed to determine power utilization and communicate the information, such as to a central monitoring station. However, the agent software applications require additional cost to obtain, install, and maintain and additional processing cycles of the IT devices when operational, which is not desirable.

SUMMARY

A method for assessing efficiency of a data center includes querying, with a data center efficiency assessment apparatus, based on a system management protocol, each of a plurality of IT devices to obtain utilization information. A power rating value is obtained at the data center efficiency assessment apparatus for each of the plurality of IT devices. An IT power consumption value for the plurality of IT devices is generated with the data center efficiency assessment apparatus based on the utilization information for the plurality of IT devices and the power rating values. A value for at least one efficiency metric is generated and output with the data center efficiency assessment apparatus based on the IT power consumption value.

A non-transitory computer readable medium having stored thereon instructions for assessing efficiency of a data center comprising machine executable code which when executed by at least one processor, causes the processor to perform steps including querying, based on a system management protocol, each of a plurality of IT devices to obtain utilization information. A power rating value is obtained for each of the plurality of IT devices. An IT power consumption value for the plurality of IT devices is generated based on the utilization information for the plurality of IT devices and the power rating values. A value for at least one efficiency metric is generated and output based on the IT power consumption value.

A data center efficiency assessment apparatus including one or more processors, a memory coupled to the one or more processors which are configured to execute programmed instructions stored in the memory including querying, based on a system management protocol, each of a plurality of IT devices to obtain utilization information. A power rating value is obtained for each of the plurality of IT devices. An IT power consumption value for the plurality of IT devices is generated based on the utilization information for the plurality of IT devices and the power rating values. A value for at least one efficiency metric is generated and output based on the IT power consumption value.

This technology provides a number of advantages including providing more efficient and accurate methods and devices to assess energy utilization of a data center without the cost and additional infrastructure of power meters and in an agent-less deployment without sacrificing granularity of the IT device energy utilization information. With this technology, a data center efficiency assessment apparatus communicates with each IT device to obtain utilization information, including a percentage utilization of a central processing unit, for example. The power utilization of each IT device is generated based on the utilization information and a power rating value for the IT device, such as a nameplate power rating established by a vendor of the IT device. Thereby, the power utilization of each IT device, and associated IT power consumption value for the plurality of IT devices, is based on actual operational characteristics of the IT devices providing for the generation of more accurate efficiency metric values and associated improved assessment of the IT infrastructure and data center energy utilization.

DETAILED DESCRIPTION

Figure 1:
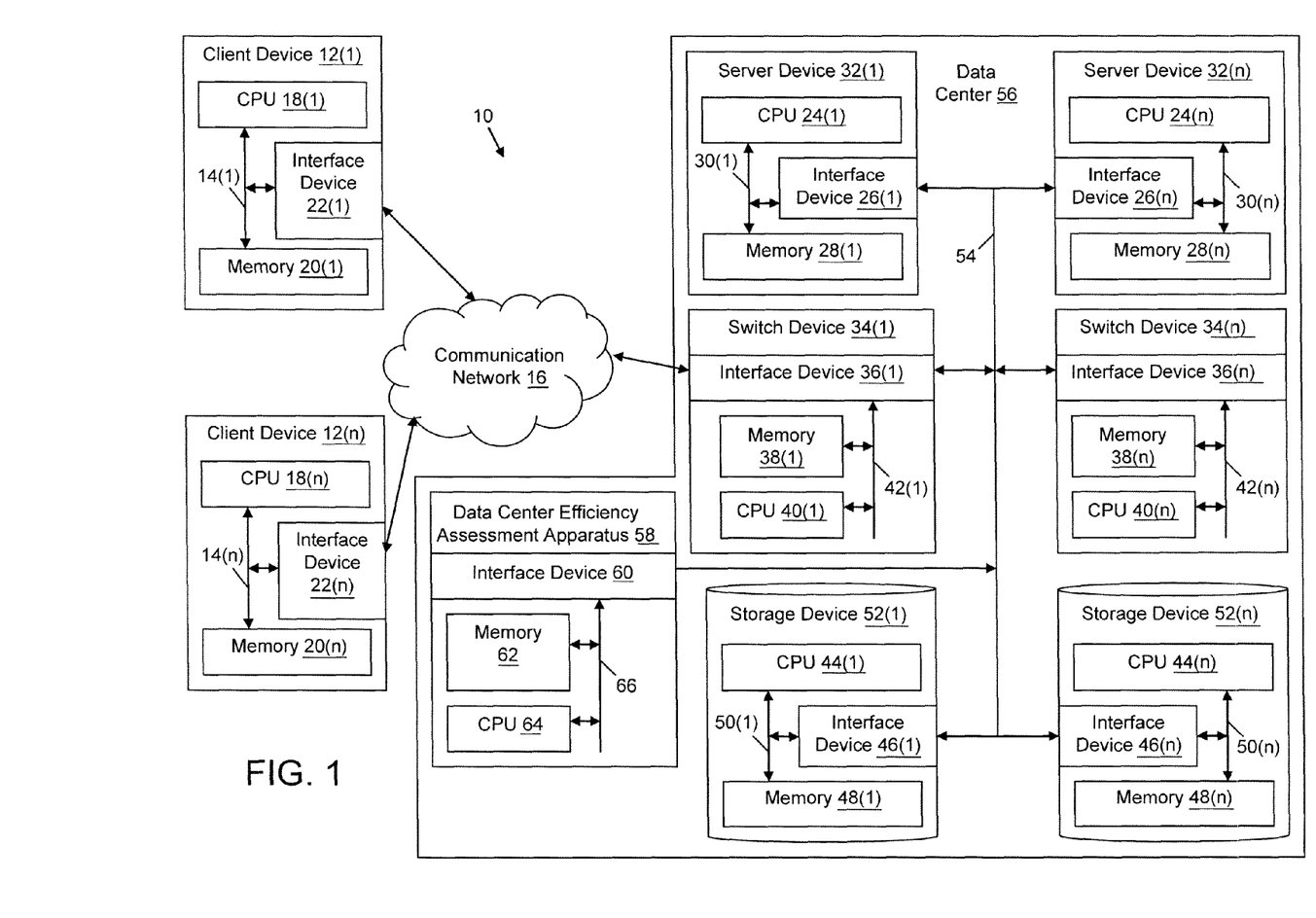
FIG. 1 is an environment with a data center efficiency assessment apparatus.

An environment 10 with an exemplary data center efficiency assessment apparatus 58 is illustrated in FIG. 1. The environment 10 includes a data center 56 including the data center efficiency assessment apparatus 58 coupled to a plurality of IT devices, such as server devices 32(1)-32(n), which may be disposed in one or more racks (not shown), switch devices 34(1)-34(n), and storage devices 52(1)-52(n) or storage servers, by a local area network (LAN) 54, although the data center 56 can include other numbers and types of IT systems, network devices, components, and elements in other configurations, such as multiple numbers of each of these apparatuses and devices. The data center 56 can further include non-IT devices (not shown), such as lighting devices, heating devices, cooling devices, switchgear, racks, monitors, and power supply devices, for example. This technology provides a number of advantages including providing more effective and accurate methods and devices to assess the energy utilization of the data center 56, and particularly the power utilization of the IT devices 32(1)-32(n), 34(1)-34(n), and 52(1)-52(n), in order to improve the efficiency of the data center 56.

The environment 10 further includes client devices 12(1)-12(n), each including a central processing unit (CPU) 18(1)-18(n) or processor, a memory 20(1)-20(n), and an interface 22(1)-22(n) or I/O system, which are coupled together by a bus 14(1)-14(n) or other link, although each could include other numbers and types of devices, elements, and components in other configurations. The client devices 12(1)-12(n) are coupled to the data center 56, and more specifically one or more of the IT devices 32(1)-32(n), 34(1)-34(n), and 52(1)-52(n) of the data center 56, such as the switch device 34(1) as shown in FIG. 1, by one or more communication networks 16 in order to facilitate storage and/or retrieval of data, for example, although this environment 10 can include other numbers and types of systems, devices, components, and elements in other configurations, such as multiple numbers of each of these apparatuses and devices.

The data center efficiency assessment apparatus 58 includes at least one CPU 64 including one or more processors, a memory 62, and an interface device 60 which are coupled together by a bus 66 or other link, although other numbers and types of systems, devices, components, and elements in other configurations and locations can be used. The CPU 64 in the data center efficiency assessment apparatus 58 executes a program of stored instructions for one or more aspects of the present technology as described and illustrated by way of the examples herein, although other types and numbers of processing devices and logic could be used and the CPU 64 could execute other numbers and types of programmed instructions.

The memory 62 in the data center efficiency assessment apparatus 58 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the apparatus or a floppy disk, hard disk, CD ROM, DVD ROM, or other computer readable medium which is read from and written to by a magnetic, optical, or other reading and writing system that is coupled to the processor 64, can be used for the memory 62.

The interface device 60 in the data center efficiency assessment apparatus 58 is used to operatively couple and communicate between the data center efficiency assessment apparatus 58, and the LAN 54 coupled to one or more of the IT devices 32(1)-32(n), 34(1)-34(n), and 52(1)-52(n). By way of example only, the communications could be based on TCP/IP over Ethernet and industry-standard protocols, including NFS, CIFS, SOAP, XML, LDAP, WBEM, WMI, and SNMP, although other types and numbers of connections, each having their own communications protocols, can be used. Additionally, while the data center efficiency assessment apparatus 58 is shown disposed in the data center 56, in other examples the data center efficiency assessment apparatus 58 is located externally to the data center 56 and the interface device 60 is configured to communicate over one or more networks with the IT devices 32(1)-32(n), 34(1)-34(n), and 52(1)-52(n) of the data center 56.

The server devices 32(1)-32(n) each include at least one CPU 24(1)-24(n) including at least one processor, a memory 28(1)-28(n), and an interface 26(1)-26(n) or I/O system, which are coupled together by a bus 30(1)-30(n) or other link, although each could include other numbers and types of devices, elements, and components in other configurations. The processor 24(1)-24(n) in the server devices 32(1)-32(n) can execute a program of stored instructions for facilitating data storage, application hosting, and/or managing Web content, for example. The memory 28(1)-28(n) in the server devices 32(1)-32(n) stores these programmed instructions, although some or all of the programmed instructions could be stored and executed elsewhere.

The switch devices 34(1)-34(n) each include at least one CPU 40(1)-40(n) including at least one processor, a memory 38(1)-38(n), and an interface 36(1)-36(n) or I/O system, which are coupled together by a bus 42(1)-42(n) or other link, although each could include other numbers and types of devices, elements, and components in other configurations. The switch devices 34(1)-34(n) are managed and/or intelligent, for example, although unmanaged switches, repeaters, routers, and/or hubs (not shown) can also be provided and configured to communicate with LAN 54. The processor 40(1)-40(n) in the switch devices 34(1)-34(n) can execute a program of stored instructions for routing communications and/or data, managing network traffic, balancing load across the server devices 32(1)-32(n) and/or storage devices 52(1)-52(n), and/or facilitating cache storage, for example. The memory 38(1)-38(n) in the switch devices 34(1)-34(n) stores these programmed instructions, although some or all of the programmed instructions could be stored and executed elsewhere.

The storage devices 52(1)-52(n) each include at least one CPU 44(1)-44(n) including at least one processor, a memory 48(1)-48(n), and an interface 46(1)-46(n) or I/O system, which are coupled together by a bus 50(1)-50(n) or other link, although each could include other numbers and types of devices, elements, and components in other configurations. The processor 44(1)-44(n) in the storage devices 52(1)-52(n) can execute a program of stored instructions for managing data or file storage and retrieval, including database services, for example. The memory 48(1)-48(n) in the storage devices 52(1)-52(n) stores these programmed instructions, although some or all of the programmed instructions could be stored and executed elsewhere.

It is to be understood that the devices and systems of the examples described herein are for exemplary purposes, as many variations of the specific hardware and software used to implement the examples are possible, as will be appreciated by those skilled in the relevant art(s). Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for assessing efficiency of a data center 56 will now be described with reference to FIGS. 1-4. In step 200, the data center efficiency assessment apparatus 58 queries, based on a system management protocol, at least a subset, and preferably all, of the plurality of IT devices 32(1)-32(n), 34(1)-34(n), and 52(1)-52(n), to obtain utilization information.

Figure 2:
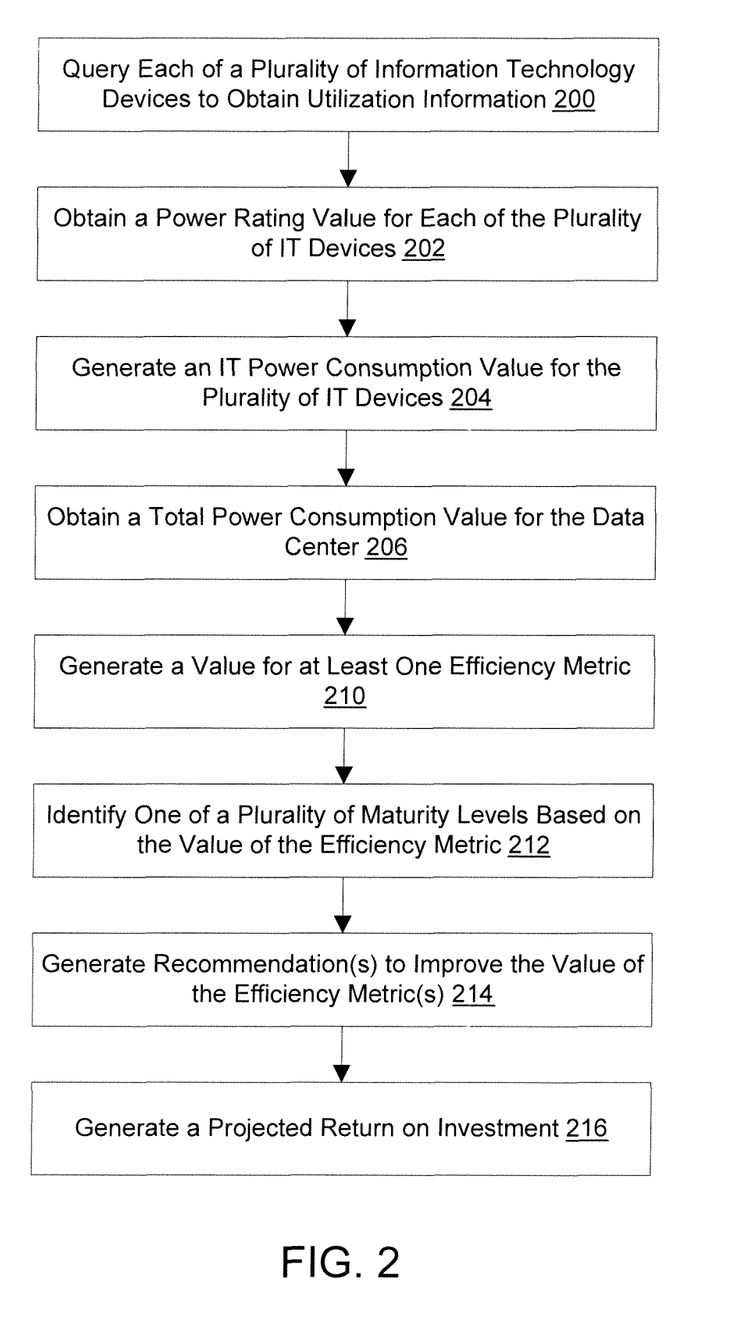
FIG. 2 is a flow chart of an exemplary method for assessing the efficiency of a data center.

The system management protocol can facilitate interfacing with hardware of the IT devices 32(1)-32(n), 34(1)-34(n), and 52(1)-52(n), including CPUs 24(1)-24(n), 40(1)-40(n), and 44(1)-44(n), and/or one or more operating system services, such as through an operating system application programming interface (API), for example. The system management protocol utilized by the data center efficiency assessment apparatus 58 can be a Web-based enterprise management (WBEM) protocol, a Windows™ management instrumentation (WMI) protocol, and/or a simple network management protocol (SNMP), for example. Preferably, any IT devices 32(1)-32(n), 34(1)-34(n), and 52(1)-52(n) implementing privilege levels are configured to provide administrator privileged, for example, to the data center efficiency assessment apparatus 58 and the IT devices 32(1)-32(n), 34(1)-34(n), and 52(1)-52(n) further have enabled one or more system management protocols, if a system management protocol is not enabled by default. The obtained utilization information for the IT devices 32(1)-32(n), 34(1)-34(n), and 52(1)-52(n) can include workload, activity/idle state, memory utilization, disk utilization, link utilization, and/or any other performance information, and preferably includes a value for the percentage of utilization of each CPU 24(1)-24(n), 40(1)-40(n), and 44(1)-44(n) for each of the IT devices 32(1)-32(n), 34(1)-34(n), and 52(1)-52(n). Optionally, the data center efficiency assessment apparatus 58 stores the obtained utilization information in the memory 62.

The operation of the data center efficiency assessment apparatus 58 can be managed by interaction with an administrator interface. In one example, parameters selectable by an administrator using the interface can include which IT devices 32(1)-32(n), 34(1)-34(n), and 52(1)-52(n) to monitor, which type(s) of utilization information to monitor, and/or the frequency with which the data center efficiency assessment apparatus 58 queries the IT devices 32(1)-32(n), 34(1)-34(n), and 52(1)-52(n).

In order to establish the IT device inventory and appropriately direct the queries, in one example, the data center efficiency assessment apparatus 58 can discover one or more of the IT devices 32(1)-32(n), 34(1)-34(n), and 52(1)-52(n) based on input to the administrator interface of LAN subnet information, for example. Optionally, an administrator of the data center efficiency assessment apparatus 58 can input, through an administrator interface, IT device 32(1)-32(n), 34(1)-34(n), and 52(1)-52(n) information, such as host/device name, manufacturer, model, storage capacity, processing capacity, operating system, technical specifications, and/or network address.

In step 202, the data center efficiency assessment apparatus 58 obtains a power rating value for each of the plurality of IT devices 32(1)-32(n), 34(1)-34(n), and 52(1)-52(n). In one example, a power rating value is obtained from a database in memory 62 as previously stored as associated with each of a plurality of manufacturers and/or models of IT devices 32(1)-32(n), 34(1)-34(n), and 52(1)-52(n), or any other identifier of an IT device 32(1)-32(n), 34(1)-34(n), and 52(1)-52(n), for example. Accordingly, once inventoried, as discussed above, information for each IT device 32(1)-32(n), 34(1)-34(n), and 52(1)-52(n) stored in memory 62 can be mapped to a respective power rating value based on the manufacturer and/or model information, or any other identifying information, for example. Preferably, the power rating values are based on nameplate power rating values established by a vendor of each IT device 32(1)-32(n), 34(1)-34(n), and 52(1)-52(n).

In step 204, the data center efficiency assessment apparatus 58 generates an IT power consumption value for the plurality of IT devices 32(1)-32(n), 34(1)-34(n), and 52(1)-52(n) based on the utilization information for each of the IT devices 32(1)-32(n), 34(1)-34(n), and 52(1)-52(n) obtained in step 200 and the power rating values for each of the IT devices 32(1)-32(n), 34(1)-34(n), and 52(1)-52(n) obtained in step 202. In one example, the value for the percentage of utilization of each CPU 24(1)-24(n), 40(1)-40(n), and 44(1)-44(n) utilized to generate the IT power consumption value is based on a current value for each IT device 32(1)-32(n), 34(1)-34(n), and 52(1)-52(n) as obtained in step 200. In another example, the value for the percentage of utilization of each CPU 24(1)-24(n), 40(1)-40(n), and 44(1)-44(n) utilized to generate the IT power consumption value is based on an average of a plurality of values for each IT device 32(1)-32(n), 34(1)-34(n), and 52(1)-52(n) previously and currently obtained by a plurality of prior queries in step 200, as stored in the memory 62. In this example, an administrator can input, using an administrator interface, the time period to be used by the data center efficiency assessment apparatus 58 to calculate the average percentage of utilization of each CPU 24(1)-24(n), 40(1)-40(n), and 44(1)-44(n). Alternatively, the average percentage of utilization of each CPU 24(1)-24(n), 40(1)-40(n), and 44(1)-44(n) can be calculated, by default, based on all of percentage of utilization values of each CPU 24(1)-24(n), 40(1)-40(n), and 44(1)-44(n) stored in the memory 62.

Accordingly, in this example, IT power consumption value is generated based on a summation of the multiplication of the value for the percentage of utilization of each CPU 24(1)-24(n), 40(1)-40(n), and 44(1)-44(n) and the respective power rating value for each IT device 32(1)-32(n), 34(1)-34(n), and 52(1)-52(n). Because the nameplate power rating value assumes peak utilization, the resulting IT power consumption value for the plurality of IT devices 32(1)-32(n), 34(1)-34(n), and 52(1)-52(n) will be relatively accurately determined by effectively reducing the power rating value for each IT device 32(1)-32(n), 34(1)-34(n), and 52(1)-52(n) according to utilization of the IT device 32(1)-32(n), 34(1)-34(n), and 52(1)-52(n), represented by the value for the percentage of utilization of the CPU 24(1)-24(n), 40(1)-40(n), and 44(1)-44(n) for each IT device 32(1)-32(n), 34(1)-34(n), and 52(1)-52(n).

In step 206, the data center efficiency assessment apparatus 58 obtains a total power consumption value for the data center 56. In one example, the total power consumption value is obtained by a power meter and communicated to the data center efficiency assessment apparatus 58 over LAN 54 or obtained by a display on the meter and input manually through the administrator interface.

In another example, a non-IT device power consumption value is obtained which includes utilization information, including power utilization, for a plurality of non-IT devices of the data center 56 including lighting equipment, heating equipment, cooling equipment, switchgear, racks, monitors, and/or power supply equipment. The non-IT device power consumption value can be obtained by administrator input, through the interface, of the non-IT device inventory and associated power rating for each non-IT device and/or device type, for example. In this example, the data center efficiency assessment apparatus 58 obtains the total power consumption value based on a summation of the non-IT device power consumption value and the IT power consumption value.

In step 210, the data center efficiency assessment apparatus 58 generates a value for at least one efficiency metric. In one example the efficiency metric is a power usage effectiveness (PUE) metric which is generated by dividing the total power consumption value by the IT power consumption value. In another example, the efficiency metric is a data center infrastructure efficiency (DCIE) metric which is generated by dividing the IT power consumption value by the total power consumption value. In other examples, the efficiency metric is any non-standard metric resulting from a repeatable calculation so as to provide relative comparison to historical data regarding the efficiency of the data center 56 and/or IT infrastructure. Accordingly, values for such efficiency metrics are advantageously generated based on more accurate data of power utilization of the IT infrastructure, calculated based on measured CPU utilization and nameplate power rating values established by vendors of the IT devices 32(1)-32(n), 34(1)-34(n), and 52(1)-52(n), without installing an agent on a plurality of IT devices 32(1)-32(n), 34(1)-34(n), and 52(1)-52(n) and without installing any power meters configured to isolate power utilization of one or more IT devices 32(1)-32(n), 34(1)-34(n), and 52(1)-52(n).

Figure 3:
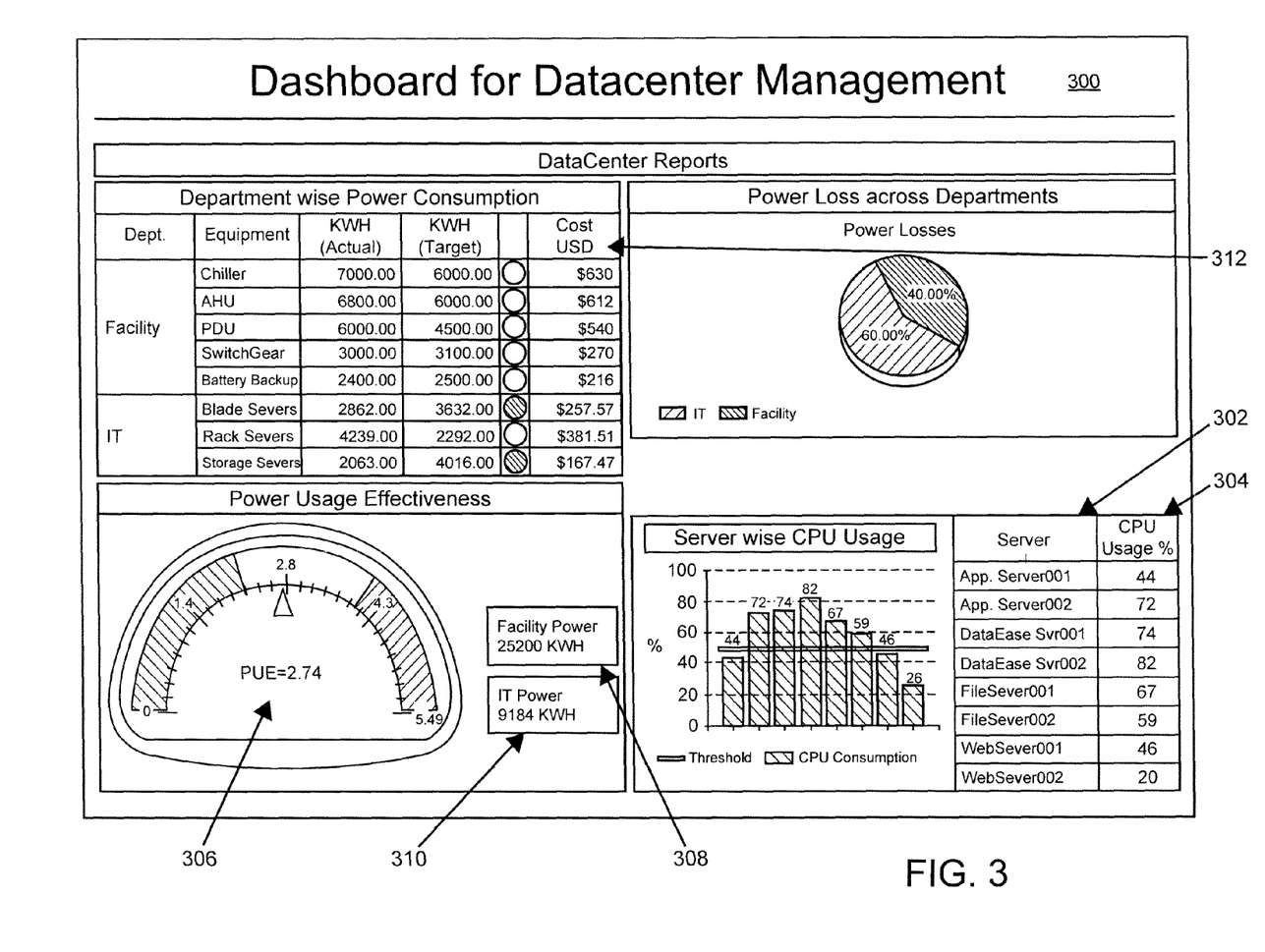
FIG. 3 is a screen shot of an exemplary dashboard including data center efficiency information.

In one example, the data center efficiency assessment apparatus 58 is optionally configured to display a dashboard, including efficiency information for the data center 56, such as the exemplary dashboard 300 shown in FIG. 3, in order to provide an administrator of the data center 56 with a graphical representation of the power utilization of various of the IT and non-IT devices, as well as the generated values for the efficiency metric(s). A server listing 302 is shown on the dashboard 300 including a name or unique identifier of each server device included in this exemplary assessment of the data center 56. A percentage CPU utilization listing 304 is shown on the dashboard 300 as including a percentage value associated with each of the server devices of the server listing 302. Thereby, an administrator of the data center 56 can be better-informed regarding server devices 32(1)-32(n) utilization and can make a more effective decision regarding IT infrastructure inventory to mitigate such issues as server sprawl and ineffective power utilization.

The dashboard 300 further includes a non-IT device power consumption value 308 and an IT device power consumption value 310, generated by the data center efficiency assessment apparatus 58, as described above. The dashboard 300 includes a graphical representation of the PUE 306, generated by the IT device power consumption value 310 by the total power consumption value calculated as a summation of the non-IT device power consumption value 308 and the IT device power consumption value 310. The dashboard 300 is shown in FIG. 3 for exemplary purposes only and any other report that is graphical and/or textual can be generated by the data center efficiency assessment apparatus 58 to include IT device 32(1)-32(n), 34(1)-34(n), and 52(1)-52(n) inventory, performance information, utilization information, and/or efficiency metric values, for example.

Additionally, the dashboard 300 includes a cost listing 312 associated with data center 56 and IT devices, such as blade servers, rack servers, and storage servers, in this example. In order to calculate the associated cost, an administrator can input to the data center efficiency assessment apparatus 58, through an administrator interface, the cost per kilowatt hour (kWh) of power supplied to the data center 56. Accordingly, the cost listing 312 includes energy cost over a specified period of time for infrastructure of a data center 56 based on the power usage values obtained in step 200, and/or input by an administrator, and the cost of supplied power.

Figure 4:
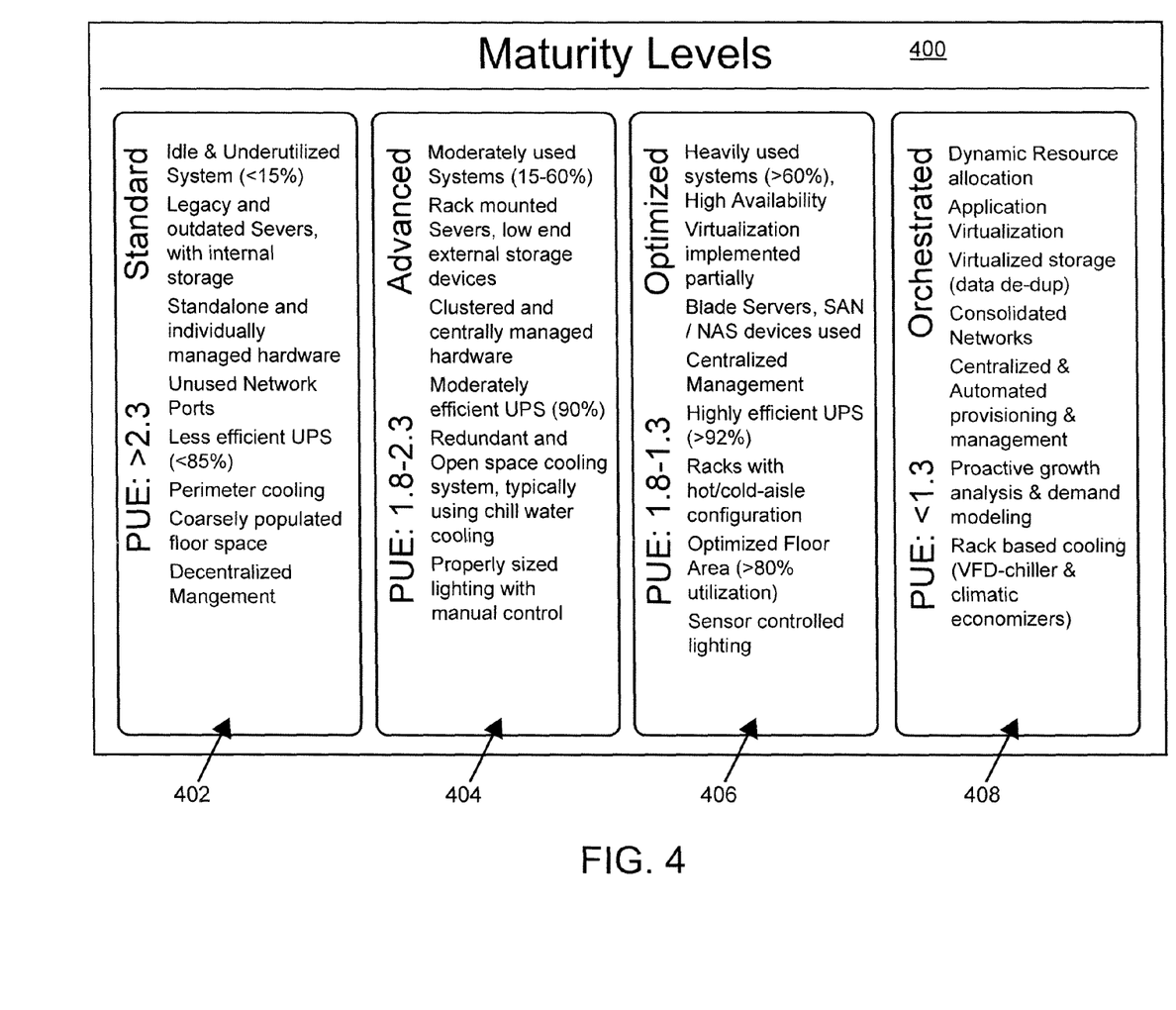
FIG. 4 is a screen shot of exemplary data center maturity levels.

In step 212, the data center efficiency assessment apparatus 58 optionally identifies one of a plurality of maturity levels, such as those shown in FIG. 4, for example, based on the value of efficiency metric generated in step 210, such as a PUE value. Exemplary maturity levels including standard 402, advanced 404, optimized 406, and orchestrated 408 are shown in FIG. 4, although any number and identification of maturity levels can be utilized.

In step 214, the data center efficiency assessment apparatus 58 optionally generates one or more recommendations for improving the efficiency metric value generated at step 210, such as a PUE value, based on the maturity level identified in step 212. In the example shown in FIG. 3, the data center 56 has a PUE value 306 of 2.74 and, therefore, the data center efficiency assessment apparatus 58 will identify the standard maturity level 402. Based on the identification of the standard maturity level 402 and/or the PUE value, the data center efficiency assessment apparatus 58 can optionally make several recommendation such as removal of underutilized server devices, upgrading server devices to rack mounted server devices, upgrading server devices to include external storage, increasing the internal storage of one or more server devices, increasing virtualization, upgrading cooling devices, upgrading lighting devices, and increasing the efficiency of one or more uninterruptable power supplies (UPS), for example, although any number and type of recommendations can be generated.

In step 216, the data center efficiency assessment apparatus 58 optionally generates a projected return on investment (ROI) for implementing one or more of the recommendations generated in step 214. For example, based on an identification of the manufacturer, model, and/or technical specifications of one or more server devices 32(1)-32(n), the data center efficiency assessment apparatus 58 may recommend, at step 214, converting one or more legacy server devices to one or more rack mounted server devices. Based on established values as stored in the memory 62, and/or values input by an administrator using an administrator interface, for the nameplate power rating of the rack mounted server devices, and the value for the percentage CPU utilization of the legacy devices obtained at step 200, the data center efficiency assessment apparatus 58 can determine the projected cost savings over a specified time period. With the projected cost savings, an administrator can make an informed decision regarding whether the investment required to upgrade to rack mounted server devices is an appropriate action to take to improve the value of the efficiency metric for the respective data center 54. While the above example is described with respect to a recommendation to upgrade server devices to rack mounted server devices, an ROI can be calculated for any number and type of recommendations generated in step 214.

Accordingly, as illustrated and described with the examples herein this technology provides more effective methods and devices for assessing efficiency of a data center, particularly with respect to energy efficiency and power utilization. The technology provides an integrated tool for assessing IT infrastructure, including IT device inventory, performance, utilization, energy efficiency, and operational cost, as well as overall data center efficiency as represented by a generated value for one or more efficiency metrics. With this technology, data center administrators can better understand, based on data obtained and generated without the operational costs of power meters and a software agents installed on each IT device and without sacrificing granularity, the energy efficiency maturity level of the respective data center in order to identify and implement strategies to operate the data center more efficiently and reduce power consumption and associated cost.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing data center energy utilization based on an improved assessment of operational characteristics of information technology (IT) infrastructure, the method comprising:
   querying, by a data center efficiency assessment apparatus, based on a system management protocol, and via a local area network, hardware or an operation system of each of the plurality IT devices to obtain utilization data for the plurality of IT devices, the utilization data corresponding to operation of the plurality of IT devices in the data center;
   obtaining, by a the data center efficiency assessment apparatus, stored power ratings for the plurality of IT devices, the power ratings stored in a database as associated with the plurality of IT devices;
   generating, by the data center efficiency assessment apparatus, IT power consumption data for the plurality of IT devices based on the utilization data and the power ratings for the plurality of IT devices; and
   generating, by the data center efficiency assessment apparatus, efficiency metric data based on the IT power consumption data and generating and outputting one or more recommendations for improving efficiency of the data center based on the efficiency metric data.

2. The method as set forth in claim 1 further comprising:
   obtaining, by the data center efficiency assessment apparatus, a total power consumption value for the data center; and
   wherein the generating the efficiency metric data further comprises at least one of:
      generating a value for a power usage effectiveness (PUE) metric by dividing the total power consumption value by the IT power consumption value; or
      generating a value for a data center infrastructure efficiency (DCIE) metric by dividing the IT power consumption value by the total power consumption value.

3. The method as set forth in claim 1 wherein the power ratings are based on nameplate power rating values established by a vendor of each of the plurality of IT devices.

4. The method as set forth in claim 1 wherein the system management protocol is selected from at least one of a Web-based enterprise management (WBEM) protocol, a Windows management instrumentation (WMI) protocol, or a simple network management protocol (SNMP).

5. The method as set forth in claim 1 wherein the utilization data for the plurality of IT devices is selected from at least one of a workload, an activity state, a memory utilization, a disk utilization, or a percentage of central processing unit utilization.

6. The method as set forth in claim 1 wherein the one or more recommendations are selected from at least one of removing underutilized server devices, upgrading server devices to rack mounted server devices, upgrading server devices to include external storage, increasing the internal storage of one or more server devices, increasing virtualization, upgrading cooling devices, upgrading lighting devices, or increasing the efficiency of one or more uninterruptable power supplies (UPS).

7. A non-transitory computer readable medium having stored thereon instructions for optimizing data center energy utilization based on an improved assessment of operational characteristics of information technology (IT) infrastructure comprising machine executable code which when executed by at least one processor, causes the processor to perform steps comprising:
   querying, based on a system management protocol and via a local area network, hardware or an operation system of each of the plurality of IT devices to obtain utilization data for the plurality of IT devices, the utilization data corresponding to operation of the plurality of IT devices in the data center;
   obtaining stored power ratings for the plurality of IT devices, the power ratings stored in a database as associated with the plurality of IT devices;
   generating IT power consumption data for the plurality of IT devices based on the utilization data and the power ratings for the plurality of IT devices; and
   generating efficiency metric data based on the IT power consumption data and generating and outputting one or more stored recommendations for improving efficiency of the data center based on the efficiency metric data.

8. The medium as set forth in claim 7 further having stored thereon one or more additional instructions comprising machine executable code which when executed by the at least one processor, causes the processor to perform one or more additional steps comprising:
   obtaining a total power consumption value for the data center; and wherein the generating the efficiency metric data further comprises at least one of:
  generating a value for a power usage effectiveness (PUE) metric by dividing the total power consumption value by the IT power consumption value; or
  generating a value for a data center infrastructure efficiency (DCIE) metric by dividing the IT power consumption value by the total power consumption value.

9. The medium as set forth in claim 7 wherein the power ratings are based on nameplate power rating values established by a vendor of each of the plurality of IT devices.

10. The medium as set forth in claim 7 wherein the system management protocol is selected from at least one of a Web-based enterprise management (WBEM) protocol, a Windows management instrumentation (WMI) protocol, or a simple network management protocol (SNMP).

11. The medium as set forth in claim 7 wherein the utilization data for the plurality of IT devices is selected from at least one of a workload, an activity state, a memory utilization, a disk utilization, or a percentage of central processing unit utilization.

12. The medium as set forth in claim 7 wherein the one or more recommendations are selected from at least one of removing underutilized server devices, upgrading server devices to rack mounted server devices, upgrading server devices to include external storage, increasing the internal storage of one or more server devices, increasing virtualization, upgrading cooling devices, upgrading lighting devices, or increasing the efficiency of one or more uninterruptable power supplies (UPS).

13. A data center efficiency assessment apparatus comprising a memory comprising programmed instructions stored in the memory and one or more processors coupled to the memory and configured to execute the programmed instructions to:
  query, based on a system management protocol and via a local area network, hardware or an operation system of each of the plurality IT devices to obtain utilization data for the plurality of IT devices, the utilization data corresponding to operation of the plurality of IT devices in the data center;
  obtain stored power ratings for the plurality of IT devices, the power ratings stored in a database as associated with the plurality of IT devices;
  generate IT power consumption data for the plurality of IT devices based on the utilization data and the power ratings for the plurality of IT devices; and
  generate efficiency metric data based on the IT power consumption data and generate and output one or more stored recommendations for improving efficiency of the data center based on the efficiency metric data.

14. The apparatus as set forth in claim 13 wherein the one or more processors are further configured to execute the programmed instructions stored in the memory to:
  obtain a total power consumption value for the data center and at least one of:
    generate a value for a power usage effectiveness (PUE) metric by dividing the total power consumption value by the IT power consumption Value; or
    generate a value for a data center infrastructure efficiency (DCIE) metric by dividing the IT power consumption value by the total power consumption value.

15. The apparatus as set forth in claim 13 wherein the power ratings are based on nameplate power rating values established by a vendor of each of the plurality of IT devices.

16. The apparatus as set forth in claim 13 wherein the system management protocol is selected from at least one of a Web-based enterprise management (WBEM) protocol, a Windows management instrumentation (WMI) protocol, or a simple network management protocol (SNMP).

17. The apparatus as set forth in claim 13 wherein the utilization data for the plurality of IT devices is selected from at least one of a workload, an activity state, a memory utilization, a disk utilization, or a percentage of central processing unit utilization.

18. The apparatus as set forth in claim 13 wherein the one or more recommendations are selected from at least one of removing underutilized server devices, upgrading server devices to rack mounted server devices, upgrading server devices to include external storage, increasing the internal storage of one or more server devices, increasing virtualization, upgrading cooling devices, upgrading lighting devices, or increasing the efficiency of one or more uninterruptable power supplies (UPS).

* * * * *